(12) United States Patent
Smith

(10) Patent No.: US 9,366,304 B2
(45) Date of Patent: Jun. 14, 2016

(54) FLEXIBLE SPRING MEMBERS, GAS SPRING ASSEMBLIES AND METHODS

(71) Applicant: Firestone Industrial Products Company, LLC, Indianapolis, IN (US)

(72) Inventor: Jason B. Smith, Avon, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/193,321

(22) Filed: Feb. 28, 2014

(65) Prior Publication Data

US 2014/0246818 A1    Sep. 4, 2014

Related U.S. Application Data

(60) Provisional application No. 61/771,640, filed on Mar. 1, 2013.

(51) Int. Cl.

| | |
|---|---|
| F16F 9/05 | (2006.01) |
| B60G 11/27 | (2006.01) |
| H04W 4/02 | (2009.01) |
| F16F 9/04 | (2006.01) |

(52) U.S. Cl.
CPC . *F16F 9/05* (2013.01); *B60G 11/27* (2013.01); *F16F 9/0445* (2013.01); *H04W 4/02* (2013.01); *B60G 2206/82* (2013.01); *F16F 2226/04* (2013.01); *Y10T 29/49611* (2015.01)

(58) Field of Classification Search
CPC ........ B60G 11/27; B60G 11/28; B60G 11/30; B60G 2206/42; B60G 2206/82; B60G 17/0521; B60G 2202/152; B60G 2204/126; B29D 23/18; B29K 2021/00; F16F 9/05; F16F 9/0445; F16F 9/0409; F16F 2226/04; F16L 11/111; F16L 11/115; H04W 4/02; Y10T 29/49611

USPC .................................. 267/64.27; 29/896.91
See application file for complete search history.

(56) References Cited

U.S. PATENT DOCUMENTS

| | | | | |
|---|---|---|---|---|
| 2,392,992 | A * | 1/1946 | Martin | B29D 23/18 138/118 |
| 2,393,493 | A * | 1/1946 | Brown | B64C 25/60 244/104 R |
| 2,622,623 | A * | 12/1952 | Michaudet | B29D 23/18 138/122 |
| 2,988,372 | A | 6/1961 | Higginbotham | |
| 2,999,681 | A * | 9/1961 | Muller | F16F 9/0445 267/64.27 |
| 3,172,428 | A * | 3/1965 | Tudge | F16L 11/10 138/110 |

(Continued)

*Primary Examiner* — Robert A Siconolfi
*Assistant Examiner* — San Aung
(74) *Attorney, Agent, or Firm* — Thomas R. Kingsbury; Fay Sharpe LLP

(57) ABSTRACT

A flexible spring member includes a flexible wall that is at least partially formed from an elastomeric material. The flexible wall can have a longitudinal axis and extend peripherally about the axis and longitudinally between first and second ends. The flexible wall can also include an outside surface and an inside surface that can at least partially define a spring chamber. A radial-biasing band can be disposed along the outside surface of the flexible wall in longitudinally-spaced relation to the first and second ends. The radial-biasing band can be at least partially formed from an elastomeric material and can be operative to elastically bias at least a portion of the flexible wall in one of a radially-inward direction and a radially-outward direction in an inflated condition of the gas spring assembly. A gas spring assembly and a method of manufacture including such a flexible spring member are also included.

20 Claims, 13 Drawing Sheets

(56) References Cited

U.S. PATENT DOCUMENTS

| | | | |
|---|---|---|---|
| 3,596,895 A * | 8/1971 | Hirtreiter | B60G 11/28 267/64.24 |
| 4,786,035 A | 11/1988 | Elliott | |
| 5,271,638 A | 12/1993 | Yale | |
| 5,580,033 A * | 12/1996 | Burkley | F16F 9/0409 264/258 |
| 2008/0174056 A1* | 7/2008 | Egolf | B60G 11/28 267/64.11 |
| 2011/0083500 A1* | 4/2011 | Rensel | B29D 22/023 73/117.03 |

* cited by examiner

FLEXIBLE SPRING MEMBERS, GAS SPRING ASSEMBLIES AND METHODS

This application claims priority from U.S. Provisional Patent Application No. 61/771,640 filed on Mar. 1, 2013, which is hereby incorporated herein by reference in its entirety.

BACKGROUND

The subject matter of the present disclosure broadly relates to the art of gas spring devices and, more particularly, to flexible spring members having a restrictive, elastomeric band disposed along the exterior thereof. Such flexible spring members can be used to form gas spring assemblies and/or suspension systems including one or more of such gas spring assemblies. Additionally, the subject matter of the present disclosure relates to methods of manufacturing flexible spring members and gas spring assemblies including the same.

The subject matter of the present disclosure may find particular application and use in conjunction with components for suspension systems of wheeled vehicles, and will be shown and described herein with reference thereto. It is to be appreciated, however, that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with gas spring suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

In some cases, it may be desirable for a suspension system to be capable of displacement through an increased range of travel, such as may permit a suspension system to be capable of undergoing a lifting action in which pressurized gas is transferred into one or more gas spring, such as, for example, may operate to increase the height of a vehicle body. Additionally, or in the alternative, it may, in some cases, be desirable for a suspension system to be capable of undergoing a kneeling action in which pressurized gas is transferred out of one or more of the gas springs, such as, for example, to reduce the height of the vehicle, such as to a level that is better suited for loading or unloading and/or for ease of ingress and egress of passengers, for example. In such cases, conventional flexible spring members and corresponding gas spring assemblies formed thereby may be less well suited for performing the foregoing and/or other operations.

Notwithstanding the common usage and overall success of conventional flexible spring members and the corresponding gas spring devices, it is believed beneficial to continue to develop end member assemblies that may advance the art of gas spring devices, such as by developing constructions that can provide desired performance characteristics and/or other features.

BRIEF SUMMARY

One example of a flexible spring member, which may alternately be referred to herein as a flexible spring member assembly, in accordance with the subject matter of the present disclosure can include a flexible wall that is at least partially formed from an elastomeric material. The flexible wall can have a longitudinal axis and can extending peripherally about the axis and longitudinally between a first end and a second end opposite the first end. The flexible wall can include an outside surface and an inside surface that can at least partially define a spring chamber. A radial-biasing band can be disposed along the outside surface of the flexible wall in longitudinally-spaced relation to the first and second ends. The radial-biasing band can be operative to elastically bias at least a portion of the flexible wall in a radially-inward direction in an inflated condition of the associated gas spring assembly.

One example of a gas spring assembly in accordance with the subject matter of the present disclosure can include a first end member and a second end member that is disposed in spaced relation to the first end member such that a longitudinal axis extends therebetween. A flexible spring member can extend longitudinally between opposing first and second ends. The first end can be operatively attached to the first end member such that a substantially fluid-tight seal is formed therebetween. The second end can be operatively attached to the second end member such that a substantially fluid-tight seal is formed therebetween. The flexible spring member can include a flexible wall that is at least partially formed from an elastomeric material. The flexible wall can include an outside surface and an inside surface that together with the first and second end members at least partially defines a spring chamber. A radial-biasing band can be disposed along the outside surface of the flexible wall in longitudinally-spaced relation to the first and second end members. The radial-biasing band can be operative to elastically bias at least a portion of the flexible wall in a radially-inward direction in an inflated condition of the gas spring assembly.

One example of a suspension system in accordance with the subject matter of the present disclosure can include a pressurized gas system and at least one gas spring assembly in accordance with the foregoing paragraph. The spring chamber of the at least one gas spring assembly can be disposed in fluid communication with the pressurized gas system such that pressurized gas can be transferred into and out of the spring chamber.

One example of a method of manufacturing a gas spring assembly in accordance with the subject matter of the present disclosure can include providing a flexible wall that is at least partially formed from an elastomeric material and has a longitudinal axis. The flexible wall can extend peripherally about the axis and longitudinally between a first end and a second end opposite the first end. The flexible wall can also include an outside surface and an inside surface. The method can also include providing a radial-biasing band at least partially formed from an elastomeric material such that the radial-biasing band can expand and contract in a radial direction. The method can further include positioning the radial-biasing band along the outside surface of the flexible wall in longitudinally-spaced relation to the first and second ends such that the radial-biasing band can elastically bias at least a portion of the flexible wall in a radially-inward direction. The method can also include securing the radial-biasing band along the outside surface of the flexible wall. In some cases, the method can further include providing a first end member and securing the first end member to the first end of the flexible wall. In some cases, the method can still further include providing a second end member and securing the second end member to the second end of the flexible wall.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
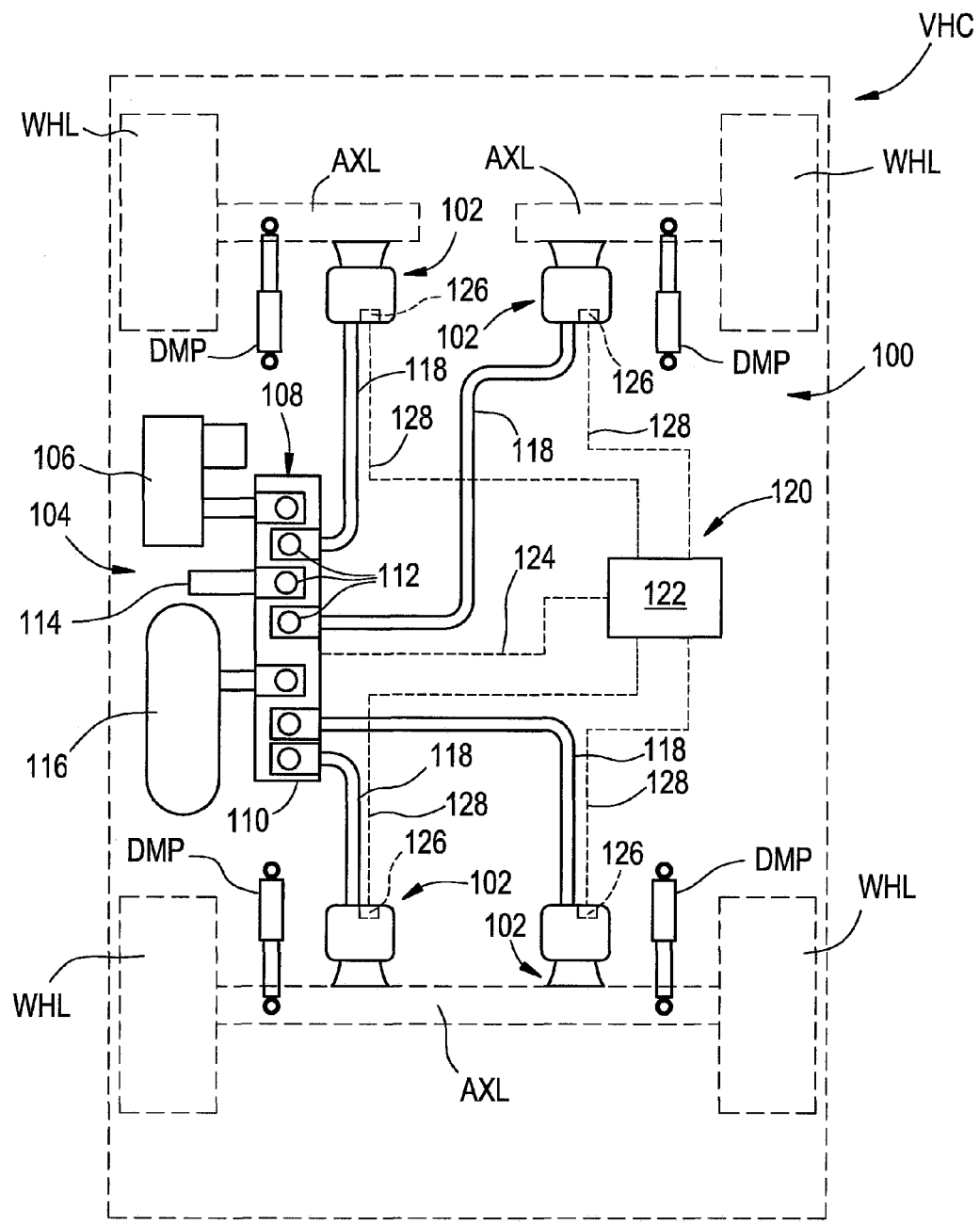
FIG. 1 is a schematic representation of one example of a suspension system of an associated vehicle including at least one gas spring assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner. Additionally, it will be appreciated that such a suspension system of the vehicle can also, optionally, include a plurality of damping members, such as dampers DMP, for example, and that any such damping members can also be operatively connected between the sprung and unsprung masses of the associated vehicle in any suitable manner.

The suspension system can also include a plurality of gas spring assemblies supported between the sprung and unsprung masses of the associated vehicle. In the arrangement shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other configuration and/or arrangement. As shown in FIG. 1, gas spring assemblies 102 are supported between axles AXL and body BDY of associated vehicle VHC. Additionally, it will be recognized that the gas spring assemblies shown and described in FIG. 1 (e.g., gas spring assemblies 102) are illustrated as being of a rolling lobe-type construction. It is to be understood, however, that gas spring assemblies of other types, kinds and/or constructions could alternately be used.

Suspension system 100 also includes a pressurized gas system 104 operatively associated with the gas spring assemblies for selectively supplying pressurized gas (e.g., air) thereto and selectively transferring pressurized gas therefrom. In the exemplary embodiment shown in FIG. 1, pressurized gas system 104 includes a pressurized gas source, such as a compressor 106, for example, for generating pressurized air or other gases. A control device, such as a valve assembly 108, for example, is shown as being in communication with compressor 106 and can be of any suitable configuration or arrangement. In the exemplary embodiment shown, valve assembly 108 includes a valve block 110 with a plurality of valves 112 supported thereon. Valve assembly 108 can also, optionally, include a suitable exhaust, such as a muffler 114, for example, for venting pressurized gas from the system. Optionally, pressurized gas system 104 can also include a reservoir 116 in fluid communication with the compressor and/or valve assembly 108 and suitable for storing pressurized gas.

Valve assembly 108 is in communication with gas spring assemblies 102 through suitable gas transfer lines 118. As such, pressurized gas can be selectively transferred into and/or out of the gas spring assemblies through valve assembly 108 by selectively operating valves 112, such as to alter or maintain vehicle height at one or more corners of the vehicle, for example.

Suspension system 100 can also include a control system 120 that is capable of communication with any one or more systems and/or components (not shown) of vehicle VHC and/or suspension system 100, such as for selective operation and/or control thereof. Control system 120 can include a controller or electronic control unit (ECU) 122 communicatively coupled with compressor 106 and/or valve assembly 108, such as through a conductor or lead 124, for example, for selective operation and control thereof, which can include supplying and exhausting pressurized gas to and/or from gas spring assemblies 102. Controller 122 can be of any suitable type, kind and/or configuration.

Control system 120 can also, optionally, include one or more height (or distance) sensing devices 126, such as, for example, may be operatively associated with the gas spring assemblies and capable of outputting or otherwise generating data, signals and/or other communications having a relation to a height of the gas spring assemblies or a distance between other components of the vehicle. Height sensing devices 126 can be in communication with ECU 122, which can receive the height or distance signals therefrom. The height sensing devices can be in communication with ECU 122 in any suitable manner, such as through conductors or leads 128, for example. Additionally, it will be appreciated that the height sensing devices can be of any suitable type, kind and/or construction.

One example of a gas spring assembly 200 in accordance with the subject matter of the present disclosure is shown in FIGS. 2-6 as having a longitudinally-extending axis AX and can include one or more end members, such as an end member 202 and an end member 204 that is spaced longitudinally from end member 202. A flexible spring member 206 can extend peripherally around axis AX and can be secured between the end members in a substantially fluid-tight manner such that a spring chamber 208 is at least partially defined therebetween.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. As shown in FIGS. 2-6, for example, end member 202 can be secured on or along a first or upper structural component USC, such as associated vehicle body BDY in FIG. 1, for example, and can be secured thereon in any suitable manner. For example, one or more securement devices, such as mounting studs 210, for example, can be included along end member 202. In some cases, the one or more securement devices (e.g., mounting studs 210) can project outwardly from end member 202 and can be secured thereon in a suitable manner, such as, for example, by way of a flowed-material joint (not shown) or a press-fit connection (not identified). Additionally, such one or more securement devices can extend through mounting holes HLS in upper structural component USC and can receive one or more threaded nuts 212 or other securement devices, for example. As an alternative to one or more of mounting studs 210, one or more threaded passages (e.g., blind passages and/or through passages) could be used in conjunction with a corresponding number of one or more threaded fasteners.

Additionally, a fluid communication port, such as a transfer passage 214, for example, can optionally be provided to permit fluid communication with spring chamber 208, such as may be used for transferring pressurized gas into and/or out of the spring chamber, for example. In the exemplary embodiment shown, transfer passage 214 extends through at least one of mounting studs 210 and is in fluid communication with spring chamber 208. It will be appreciated, however, that any other suitable fluid communication arrangement could alternately be used.

End member assembly 204 can be secured on or along a second or lower structural component LSC, such as an axle AXL in FIG. 1, for example, in any suitable manner. As one example, lower structural component LSC could include one or more mounting holes HLS extending therethrough. In such case, a threaded fastener 216 could extend through one of mounting holes HLS and threadably engage end member 204 or a component thereof to secure the end member on or along the lower structural component.

Flexible spring member 206 can be of any suitable size, shape, construction and/or configuration. As one example, flexible spring member 206 can include a flexible wall 218 that is at least partially formed from one or more layers or plies of elastomeric material (e.g., natural rubber, synthetic rubber and/or thermoplastic elastomer) and can optionally include one or more plies or layers of filament reinforcing material. Flexible wall 218 is shown extending in a longitudinal direction between opposing ends 220 and 222. In some cases, flexible spring member 206 can, optionally, include a mounting bead disposed along either one or both of ends 220 and 222 of the flexible wall. In the arrangement shown in FIGS. 2-6, mounting beads 224 and 226 are shown as being respectively disposed along ends 220 and 222. In some cases, the mounting beads can, optionally, include a reinforcing element, such as an endless, annular bead wire 228, for example.

It will be appreciated that the one or more end members can be of any suitable type, kind, construction and/or configuration, and can be operatively connected or otherwise secured to the flexible spring member in any suitable manner. In the arrangement shown in FIGS. 2, 3, 5 and 6, for example, end member 202 is of a type commonly referred to as a bead plate and is secured to end 220 of flexible wall 218 using a crimped-edge connection in which an outer peripheral edge 230 of end member 202 is crimped or otherwise deformed around mounting bead 224 such that a substantially fluid-tight seal is formed therebetween.

Additionally, in the arrangement shown in FIGS. 2, 3, 5 and 6, end member 204 is shown as being of a type commonly referred to as a piston (or a roll-off piston). End member 204 has an outer surface 232 that abuttingly engages flexible spring member 206 such that a rolling lobe 234 is formed along flexible wall 218. As gas spring assembly 200 is displaced between compressed and extended conditions, rolling lobe 234 is displaced along outer surface 232 in a generally conventional manner. Additionally, it will be appreciated that the exterior of the end member can have any suitable size, shape and/or configuration, such as may be useful to provide one or more desired performance characteristics, for example.

Figure 3:
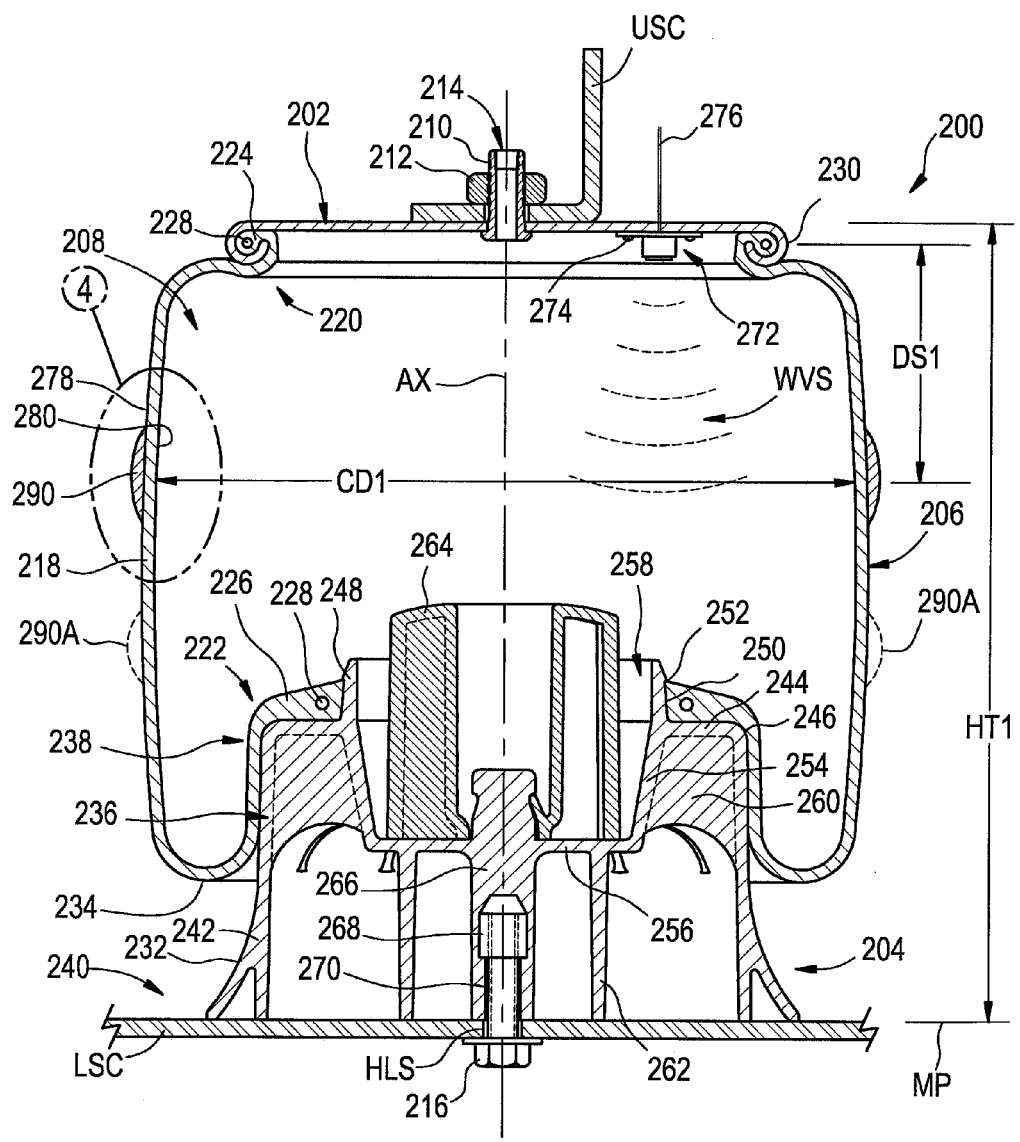
FIG. 3 is a cross-sectional side view of the gas spring assembly in FIG. 2 taken from along line 3-3 in FIG. 2 and shown in a first inflated condition.
Figure 5:
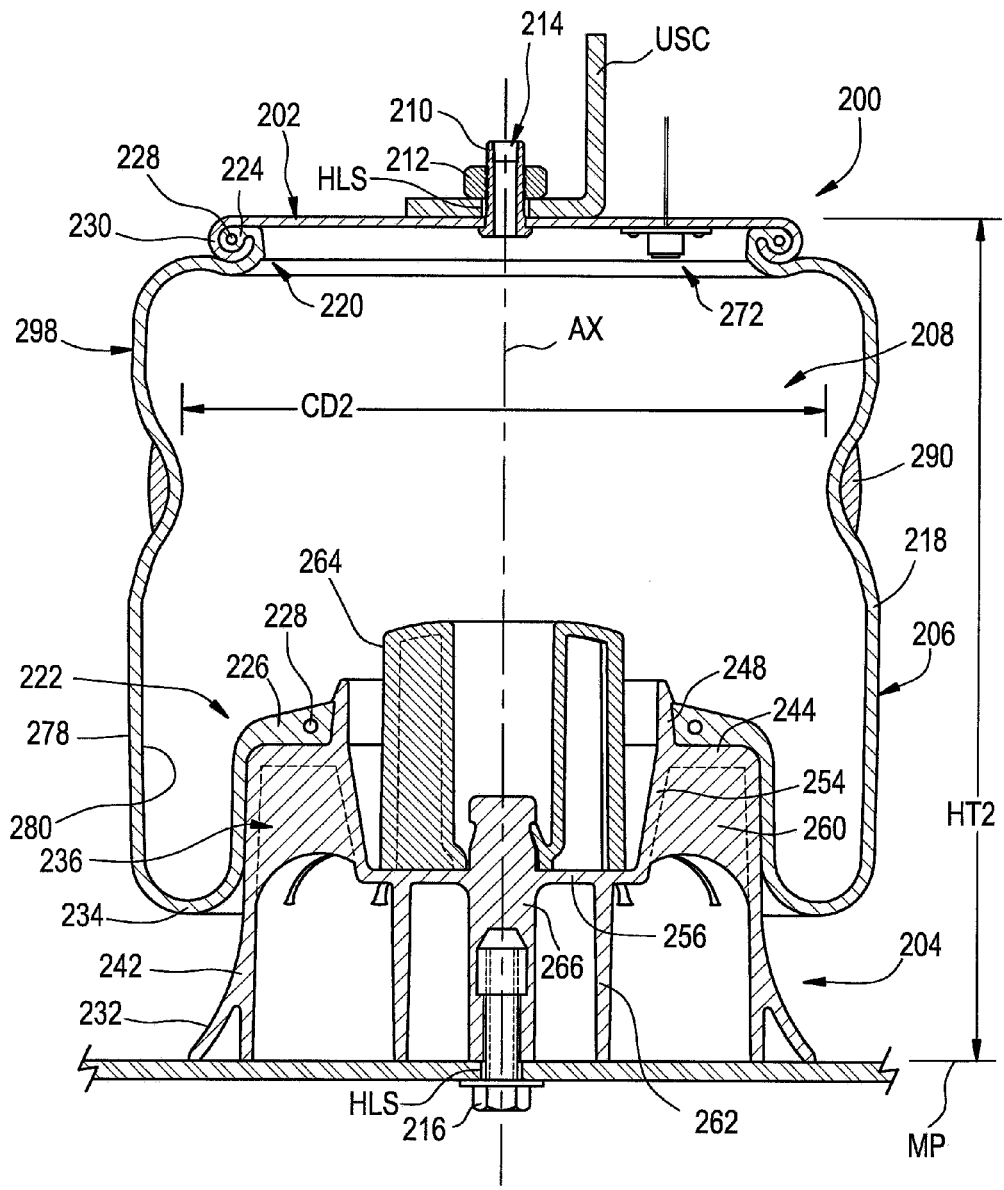
FIG. 5 is a cross-sectional side view of the gas spring assembly in FIGS. 2-4 shown in a second inflated condition.
Figure 6:
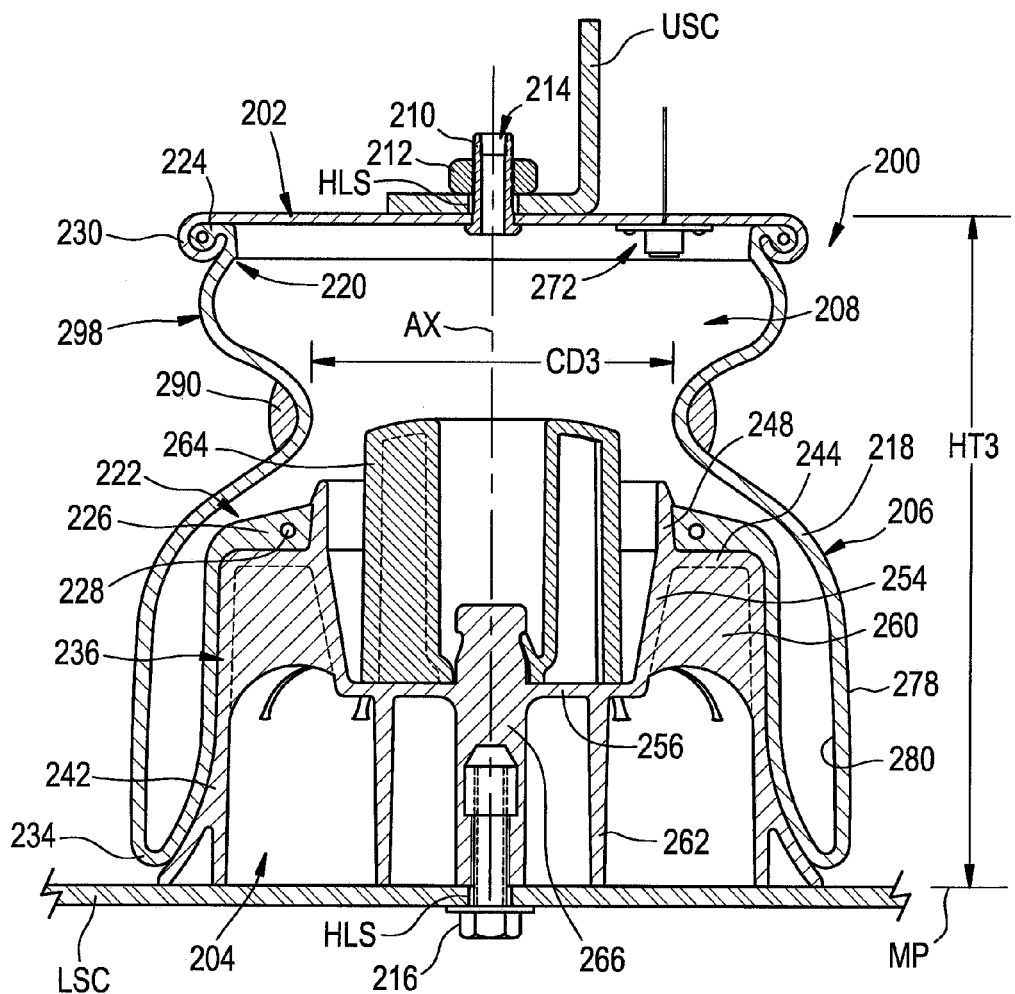
FIG. 6 is a cross-sectional side view of the gas spring assembly in FIGS. 2-5 shown in a third inflated condition.
Figure 7:
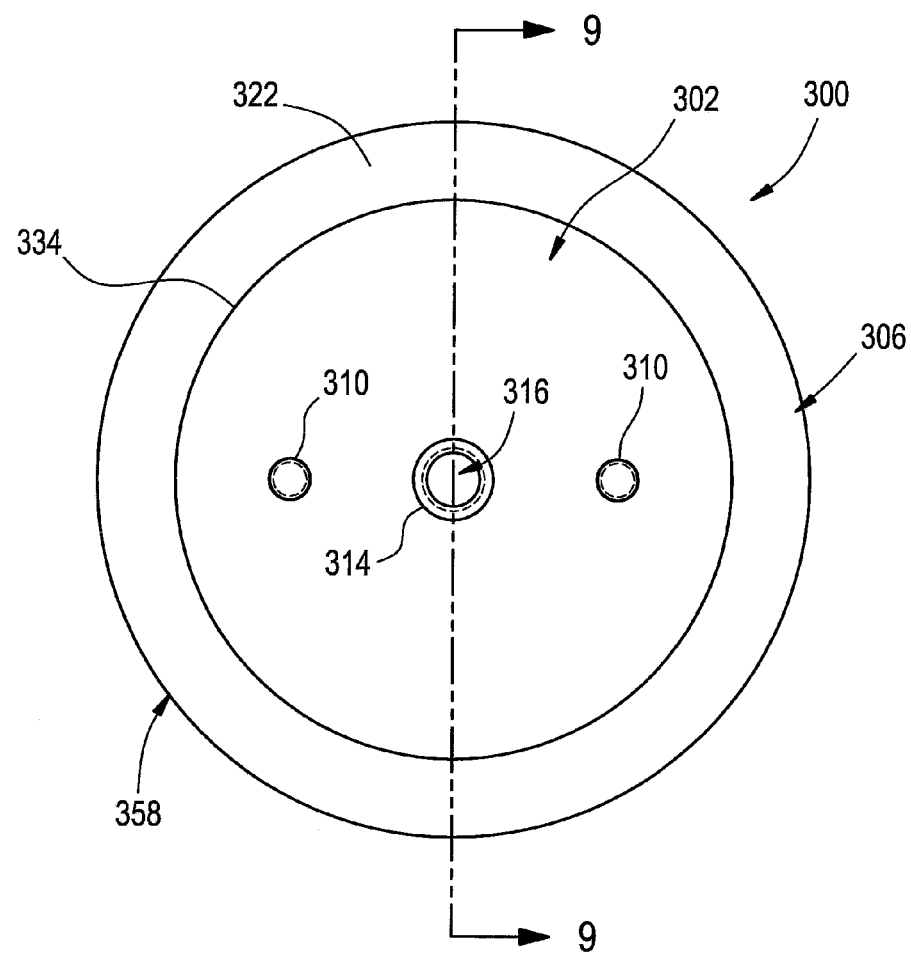
FIG. 7 is a top plan view of another example of a gas spring assembly that includes another example of a flexible spring member in accordance with the subject matter of the present disclosure.

As identified in FIGS. 3, 5 and 6, end member 204 includes an end member body 236 and extends from along a first or upper end 238 toward a second or lower end 240 that is spaced longitudinally from end 238. Body 236 includes a longitudinally-extending outer side wall 242 that extends peripherally about axis AX and at least partially defines outer surface 232. An end wall 244 is disposed transverse to axis AX and extends radially-inward from along a shoulder portion 246, which is disposed along the outer side wall toward end 238. Body 236 also includes an inner side wall 248 that extends longitudinally-outward beyond end wall 244 and peripherally about axis AX. Inner side wall 248 has an outer surface 250 that is dimensioned to receive end 222 of flexible wall 206 such that a substantially fluid-tight seal can be formed therebetween. A retaining ridge 252 can project radially-outward from along inner side wall 248 and can extend peripherally along at least a portion thereof.

Body 236 can also include an inner side wall 254 that extends longitudinally-inward into the body from along end wall 244. Inner side wall 254 can terminate at a bottom wall 256 that is approximately planar and can be disposed transverse to axis AX such that inner side wall 254 and bottom wall 256 at least partially define a cavity 258 within body 236. In some cases, bridge walls 260 can, optionally, extend between and operatively interconnect outer side wall 242 and inner side wall 254.

An inner support wall 262 can be disposed radially-inward from outer side wall 242 and can extend peripherally about axis AX. In some cases, inner support wall 262 can form a hollow column-like structure that projects from along bottom wall 256 in a longitudinal direction toward end 240. In some cases, the distal end of outer side wall 242 and/or the distal end of inner support wall 262 can at least partially define a mounting plane MP formed along end 240 of the end member body. In this manner, body 236 can be supported at least in part by outer side wall 242 and/or inner support wall 262, such as on or along an associated structural member (e.g., lower structural component LSC in FIGS. 3, 5 and 6). In some cases, axially applied loads or forces transmitted to bottom wall 256, such as from impacts imparted on a jounce bumper 264, for example, can be reacted, communicated or otherwise at least partially transferred to the associated mounting structure by the inner support wall.

Body 236 can also include a central wall 266 that is disposed radially-inward from inner support wall 262 and forms a post-like structure that projects from along bottom wall 256 in a direction toward end 240. In some cases, central wall 266 can terminate in approximate alignment with mounting plane MP, such as is illustrated in FIGS. 3, 5 and 6, for example. End member 204 can optionally include one or more features or components suitable for use in securing the end member on or along an associated structural component. As one example, a threaded insert 268 can be molded into or otherwise captured and retained within central wall 266 and can be dimensioned to receive a suitable threaded fastener (e.g., threaded fastener 216) for securement of the end member on or along the associate structural component (e.g., lower structural component LSC). In some cases, a longitudinally-extending passage 270 can extend into central wall 266 from along mounting plane MP such that the threaded fastener can reach and engage insert 268 or another suitable feature.

In some cases, a height or distance sensing device 272 can be, optionally, included, such as is shown in FIGS. 3, 5 and 6, for example. It will be appreciated that such a height or distance sensing device can be supported on or along an end member (e.g., one of end members 202 and 204) in any suitable manner. As one example, height sensing device 272 can be disposed within spring chamber 208 along end member 202 and can be secured thereto using suitable fasteners 274. Height sensing device 272 can be of any suitable type, kind and/or construction, such as an ultrasonic sensor that transmits and receives ultrasonic waves WVS (FIG. 3), for example. Additionally, it will be appreciated that height sensing device 272 can be connected to other systems and/or components of a vehicle suspension system in any suitable manner. As shown in FIGS. 3, 5 and 6, height sensing device 272 includes a lead or connection 276 that can be used for such communication purposes, such as is indicated by leads 128 of control system 120 in FIG. 1, for example.

Additionally, as indicated above, flexible wall 218 of flexible spring member 206 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 218 can include an outer surface 278 and an inner surface 280, which can at least partially define spring chamber 208. Additionally, as identified in FIG. 4, flexible wall 218 can include an outer or cover ply 282 that at least partially forms outer surface 278, an inner or liner ply 284 that at least partially forms inner surface 280, and one or more reinforcing plies disposed between outer and inner surfaces 278 and 280. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Figure 2:
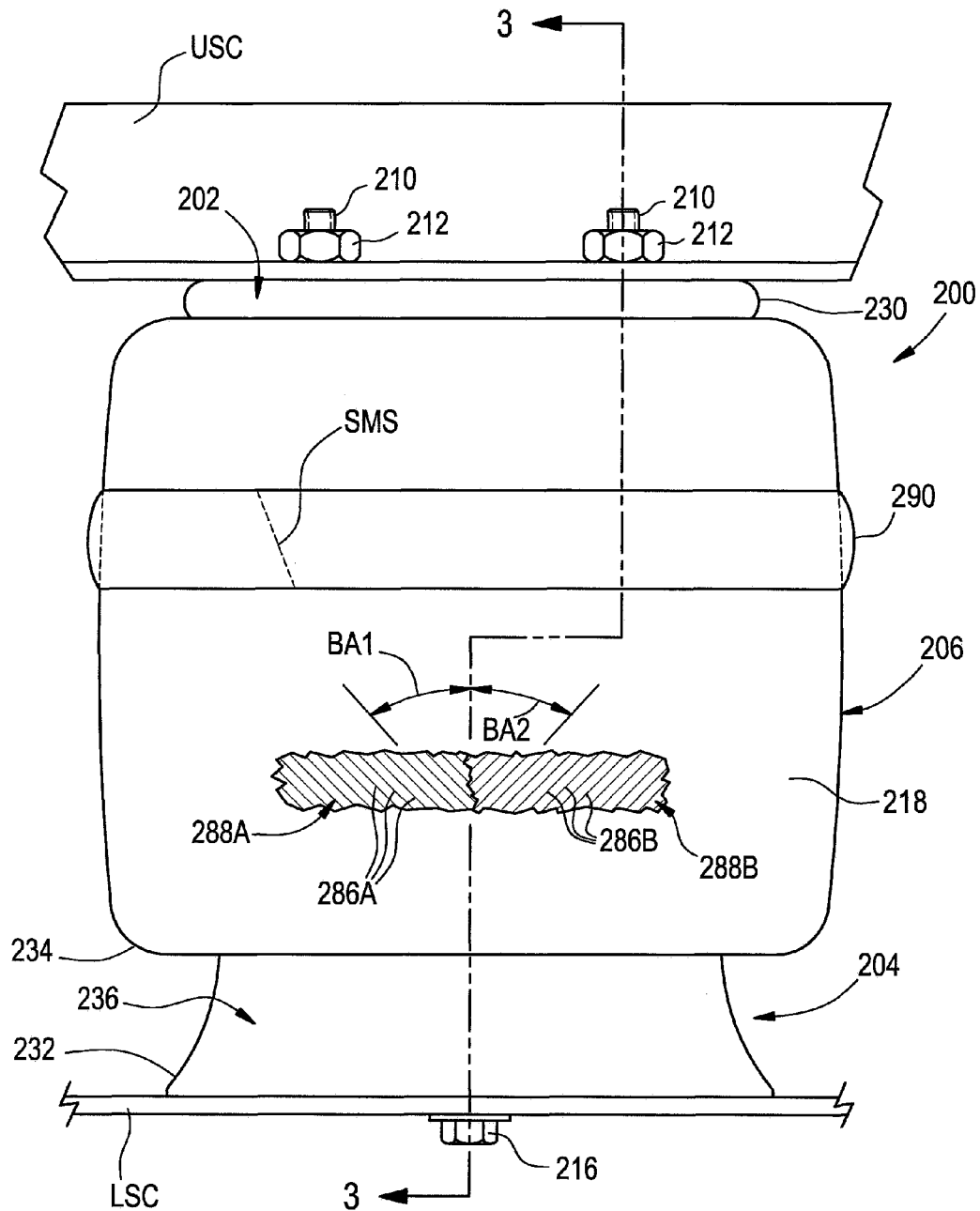
FIG. 2 is a side elevation view of one example of a gas spring assembly that includes one example of a flexible spring member in accordance with the subject matter of the present disclosure.
Figure 4:
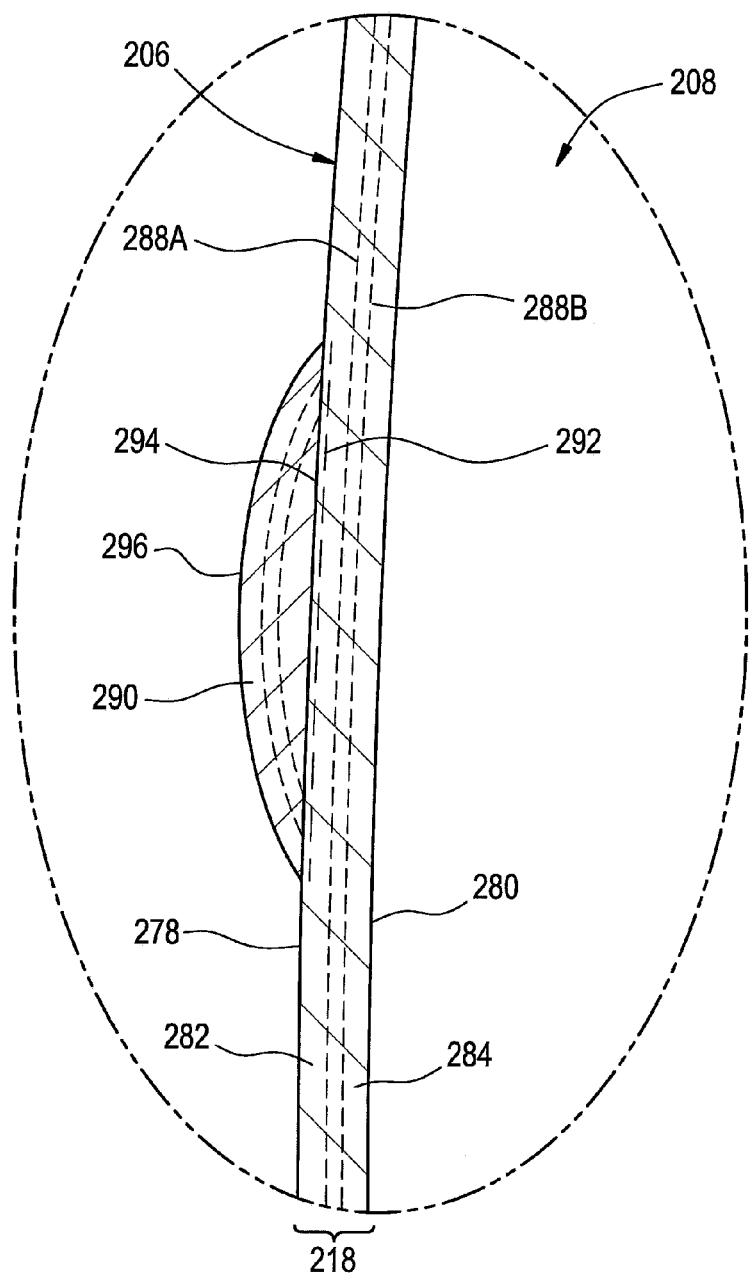
FIG. 4 is an enlarged cross-sectional view of the portion of the flexible spring member identified in Detail 4 of FIG. 3.

Additionally, it will be appreciated that the one or more lengths of filament material, if provided, can be oriented in any suitable manner. As one example, flexible wall 218 is shown in FIGS. 2 and 4 as including a plurality of filament segments 286A of one reinforcing ply 288A disposed at one bias angle BA1 (FIG. 2) and a plurality of filament segments 286B of another reinforcing ply 288B disposed another bias angle BA2 (FIG. 2). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 2 by reference dimensions BA1 and BA2, for example.

A gas spring assembly according to the subject matter of the present disclosure can also include one or more radial-biasing bands (which may also be referred to herein as restrictive bands) that operatively engage the flexible spring member. Such one or more radial-biasing bands can extend peripherally about the exterior of a flexible spring member and assist in biasing at least a portion of the flexible wall of the flexible spring member in a radially-inward direction. It will be appreciated that the one or more radial-biasing bands can be formed form any suitable elastomeric material or combination of elastomeric and non-elastomeric materials.

One example of such a construction is shown in FIGS. 2-6 in which flexible spring member 206 of gas spring assembly 200 includes a radial-biasing band 290 that can be supported on or along the flexible spring member in any suitable manner. In some cases, two or more radial-biasing bands can be used. For example, a radial-biasing band 290A is shown in FIG. 3 as being disposed along flexible spring member 206 in longitudinally-spaced relation to radial-biasing band 290. If included, radial-biasing band 290A can extend peripherally about the exterior of a flexible spring member and assist in biasing at least a portion of the flexible wall of the flexible spring member in a radially-inward direction, such as has been described above.

In some cases, the one or more radial-biasing bands can be formed as separate components that are positioned along the flexible spring member in spaced relation to the end members of the gas spring assembly. In such cases, the radial-biasing band(s) can be retained in position along the outer surface of the flexible wall of the flexible spring member by frictional contact (i.e., a frictional interface) with the outer surface of the flexible wall and/or by way of a suitable flowed-material joint (e.g., an adhesive interface) with the outer surface of the flexible wall.

In other cases, the radial-biasing band can be initially formed from a suitable elastomeric material that is in an uncured condition. The uncured band can be positioned on or along the outer surface of the flexible wall and then subsequently cured to form a bond or joint (i.e., a cure-bonded interface) with the flexible wall. Joints of the foregoing types and kinds are broadly represented in FIG. 4 by dashed line 292. It will be appreciated, however, that in some cases, the material of the flexible wall can be in an uncured condition when one or more uncured bands are positioned on or along the outside surface of the flexible wall. In such cases, the flexible wall and the one or more radial-biasing bands can be cured simultaneously (i.e., a dual cure-bonded interface) and, in some cases, can form a substantially unitary mass of material in which joint 292 may not be present or identifiable.

In some cases, one or more of the radial-biasing bands can be removably secured on or along the outer surface of the flexible wall of the flexible spring member, such as by way of a frictional interface or a non-permanent adhesive interface, for example. In other cases, one or more of the radial-biasing bands can be permanently secured (i.e., inseparable without damage, destruction or material alteration of at least one of the component parts) on or along the outer surface of the flexible wall of the flexible spring member, such as by way of a permanent adhesive interface, a cure-bonded interface or a dual cure-bonded interface, for example. In cases in which two or more radial-biasing bands are used, a common type of interface or two or more different interfaces can be used.

In the arrangement shown in FIGS. 2-6, radial-biasing band 290 includes an exterior surface (not numbered) with a radially-inward surface portion 294 disposed toward outer surface 278 of flexible wall 218. The exterior surface of radial-biasing band 290 also includes a radially-outward surface portion 296 disposed opposite surface portion 294 and, in general, facing away from the outer surface of the flexible wall. In cases in which two or more radial-biasing bands are included, the two or more radial-biasing bands can have a common or otherwise substantially similar construction, such as is described above, for example. Alternately, the two or more radial-biasing bands can be of different sizes, shapes, configurations and/or constructions relative to one another.

The one or more radial-biasing bands can be disposed on or along the flexible spring member in any position or orientation suitable for assisting in biasing at least a portion of the flexible wall of the flexible spring member in a radially-inward direction. In a preferred arrangement, the one or more radial-biasing bands are disposed in spaced relation to the ends and/or the mounting beads of the flexible spring member, the end members and/or the associated structural components of the gas spring assembly. It will be appreciated that the flexible wall of the flexible spring member will have an overall wall length (not identified), such as may be defined as the sum of linear and non-linear (e.g., curved) wall sections extending between mounting beads 224 and 226, for example.

Radial-biasing band 290 is shown as being disposed along flexible wall 218 in spaced-apart relation to both end 220 and mounting bead 224 as well as both end 222 and mounting bead 226. In a preferred arrangement, a radial-biasing band, such as radial-biasing band 290 and/or 290A, for example, can be spaced apart from each end (e.g., end 220 and/or 222) and/or mounting bead (e.g., mounting bead 224 and/or 226) by a distance of at least approximately 15 percent of the overall wall length of the flexible wall (e.g., flexible wall 218), such as is represented in FIG. 5 by reference dimension DS1, for example. As a result, in a preferred arrangement, a given flexible wall can have an intermediate wall section (not identified) of approximately 70 percent of the overall wall length along which the one or more restrictive bands can be positioned.

With reference, now, to FIGS. 2, 3, 5 and 6, gas spring assembly 200 is illustrated in FIGS. 2 and 3 in a first inflated condition in which the gas spring assembly has a first height, which is represented in FIG. 3 by reference dimension HT1. In some cases, the first inflated condition and first height HT1 can correspond to a nominal design height of the gas spring assembly under normal conditions of use. Under such conditions, the portion of flexible wall 218 engaging radial-biasing band 290 can have a first or an approximately full cross-sectional dimension, such as is represented in FIG. 3 by reference dimension CD1.

Gas spring assembly 200 is shown in FIG. 5 in a second inflated condition in which the gas spring assembly has a second height HT2. It will be appreciated that the second inflated condition and the second height can correspond to a condition of use under which a reduced volume of pressurized gas is contained within the gas spring assembly, such as may occur as a result of the initiation of a kneeling action of a suspension system, for example. As a result of the reduced volume of pressurized gas, gas spring assembly 200 assumes second height HT2 which is less than first height HT1, and radial-biasing band 290 urges a portion of flexible wall 218 radially inward to at least partially form a convoluted wall section 298 while retaining the section of flexible wall 218 that forms rolling lobe 234. In this manner, a portion of the overall wall length of flexible wall 218 can be accommodated through radially-inward displacement due to the influence and radially-inward biasing of radial-biasing band 290. As a result, radial-biasing band 290 and the portion of flexible wall 218 adjacent thereto can assume a second cross-sectional dimension, which is represented in FIG. 5 by reference dimension CD2, that is less than cross-sectional dimension CD1. As a result, gas spring assembly 200 can assume second height HT2 without generating a corresponding full displacement of rolling lobe 234 along outer surface 232 of end member 204, which is shown as being in approximately the same position as the rolling lobe in FIGS. 2 and 3.

Gas spring assembly 200 is shown in FIG. 6 in a third inflated condition in which the gas spring assembly has a third height HT3. It will be appreciated that the third inflated condition and third height can correspond to a condition of use under which a further reduced volume of pressurized gas is contained within the gas spring assembly, such as may occur as a result of the continuation of a kneeling action of a suspension system, for example. As a result of the reduced volume of pressurized gas, gas spring assembly 200 assumes third height HT3 which is less than second height HT2, and radial-biasing band 290 further urges the portion of flexible wall 218 radially inward while retaining convoluted wall section 298 and the section of flexible wall 218 that forms rolling lobe 234. In this manner, a greater portion of the overall wall length of flexible wall 218 can be accommodated through radially-inward displacement due to the influence and radially-inward biasing of radial-biasing band 290. As a result, radial-biasing band 290 and the portion of flexible wall 218 adjacent thereto can assume a third cross-sectional dimension, which is represented in FIG. 5 by reference dimension CD3, that is less than cross-sectional dimension CD2. As a result, gas spring assembly 200 can assume third height HT3 (i.e., accommodate the addition reduction in height from second height HT2) by permitting the displacement of rolling lobe 234 along outer surface 232 of end member 204, such as in the manner illustrated in FIG. 6, for example.

Another example of a gas spring assembly 300 in accordance with the subject matter of the present disclosure is shown in FIGS. 7-12 as having a longitudinally-extending axis AX, and can include one or more end members, such as an end member 302 and an end member 304 that is spaced longitudinally from end member 302. A flexible wall 306 can extend peripherally around axis AX and can be secured between the end members in a substantially fluid-tight manner such that a spring chamber 308 is at least partially defined therebetween.

Gas spring assembly 300 can be disposed between associated sprung and unsprung masses of an associated vehicle in any suitable manner. For example, one end member can be operatively connected to the associated sprung mass with the other end member disposed toward and operatively connected to the associated unsprung mass. In the embodiment shown in FIG. 8, for example, end member 302 is secured along a first or upper structural component USC, such as associated vehicle body BDY in FIG. 1, for example, and can be secured thereon in any suitable manner. For example, one or more securement devices, such as mounting studs 310, for example, can be included along end member 302. In some cases, the one or more securement devices (e.g., mounting studs 310) can project outwardly from end member 302 and can be secured thereon in a suitable manner, such as, for example, by way of a flowed-material joint (not shown) or a press-fit connection (not identified). Additionally, such one or more securement devices can extend through mounting holes HLS (FIGS. 3, 5 and 6) in upper structural component USC and receive one or more securement devices, such as threaded nuts 312, for example.

Additionally, one or more gas transfer ports can optionally be provided to permit fluid communication with spring chamber 308, such as may be used for transferring pressurized gas into and/or out of the spring chamber. For example, a connection can be provided on or along one of the end members (e.g., end member 302) such as may be used for attachment of a gas transfer line (e.g., one of gas transfer lines 118 in FIG. 1). In the exemplary arrangement shown in FIGS. 7, 9, 11 and 12, a connector fitting 314 is provided on or along one of the end members (e.g., end member 302) such as may be used for attachment of one of gas transfer lines 118 in FIG. 1, for example, and can include a passage 316 extending through the end member in fluid communication with spring chamber 308.

End member 304 can be secured along a second or lower structural component LSC, such as an axle AXL in FIG. 1, for example, in any suitable manner. As one example, lower structural component LSC could include one or more mounting holes HLS (FIGS. 3, 5 and 6) extending therethrough. One or more securement devices, such as mounting studs 318, for example, can be included along end member 304. In some cases, the one or more securement devices (e.g., mounting studs 318) can project outwardly from end member 304 and can be secured thereon in a suitable manner, such as, for example, by way of a flowed-material joint (not shown) or a press-fit connection (not identified). Additionally, such one or more securement devices can extend through the mounting holes in lower structural component USC and receive one or more securement devices, such as a threaded nuts 320, for example. As an alternative to one or more of mounting studs 310 and/or 316, one or more threaded passages (e.g., blind passages and/or through passages) could be used in conjunction with a corresponding number of one or more threaded fasteners.

Flexible spring member 306 can be of any suitable size, shape, construction and/or configuration. As one example, flexible spring member 306 can include a flexible wall 322 that is at least partially formed from one or more layers or plies of elastomeric material (e.g., natural rubber, synthetic rubber and/or thermoplastic elastomer) and can optionally include one or more plies or layers of filament reinforcing material. Flexible wall 322 is shown extending in a longitudinal direction between opposing ends 324 and 326. In some cases, flexible wall 322 can, optionally, include a mounting bead disposed along either one or both of ends 324 and 326. In the arrangement shown in FIGS. 8, 9, 11 and 12, mounting beads 328 and 330 are shown as being respectively disposed along ends 324 and 326. In some cases, the mounting beads can, optionally, include a reinforcing element, such as an endless, annular bead core 332, for example.

It will be appreciated, that end members 302 and 304 can be of any suitable type, kind, configuration and/or construction, and that the ends of flexible spring member 306 can be secured on, along and/or otherwise interconnected between end members 302 and 304 in any suitable manner. As one example, end members 302 and 304 can be of a type commonly referred to as a bead plate. End member 302 is shown as being secured to end 324 of flexible wall 322 using a crimped-edge connection in which an outer peripheral edge 334 of end member 302 is crimped or otherwise deformed around mounting bead 328 such that a substantially fluid-tight seal is formed therebetween. Similarly, end member 304 is shown as being secured to end 326 of flexible wall 322 using a crimped-edge connection in which an outer peripheral edge 336 is crimped or otherwise deformed around mounting bead 330 such that a substantially fluid-tight seal is formed therebetween.

Gas spring assembly 300 is shown as being of a type commonly referred to as a convoluted or bellows-type construction, and it will be appreciated that any suitable type or kind of convoluted spring construction can be used. As such, a flexible spring member according to the subject matter of the present disclosure can have any suitable number of one or more convoluted wall portions. Additionally, as indicated above, flexible wall 322 of flexible spring member 306 can be formed in any suitable manner and from any suitable material or combination of materials, such as by using one or more fabric-reinforced, elastomeric plies or layers and/or one or more un-reinforced, elastomeric plies or layers, for example. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 322 can include an outer surface 338 and an inner surface 340, which can at least partially define spring chamber 308. Additionally, flexible wall 322 can include an outer or cover ply 342 that at least partially forms outer surface 338, an inner or liner ply 344 that at least partially forms inner surface 340, and one or more reinforcing plies disposed between outer and inner surfaces 338 and 346. The one or more reinforcing plies can be of any suitable construction and/or configuration. For example, the one or more reinforcing plies can include one or more lengths of filament material that are at least partially embedded therein. It will be appreciated that the one or more lengths of filament material can be of any suitable type, kind and/or construction, such as monofilament polymeric strands, braided cotton yarn or bundled carbon fibers, for example. Furthermore, such one or more lengths of filament material could optionally be coated or otherwise treated, such as, for example, to improve adhesion with the adjacent plies or other surrounding material. For example, the filament material could be rubber coated, such that upon applying a layer of rubber over the filament material improved adhesion between the various layers could result during and/or after vulcanization, for example.

Figure 8:
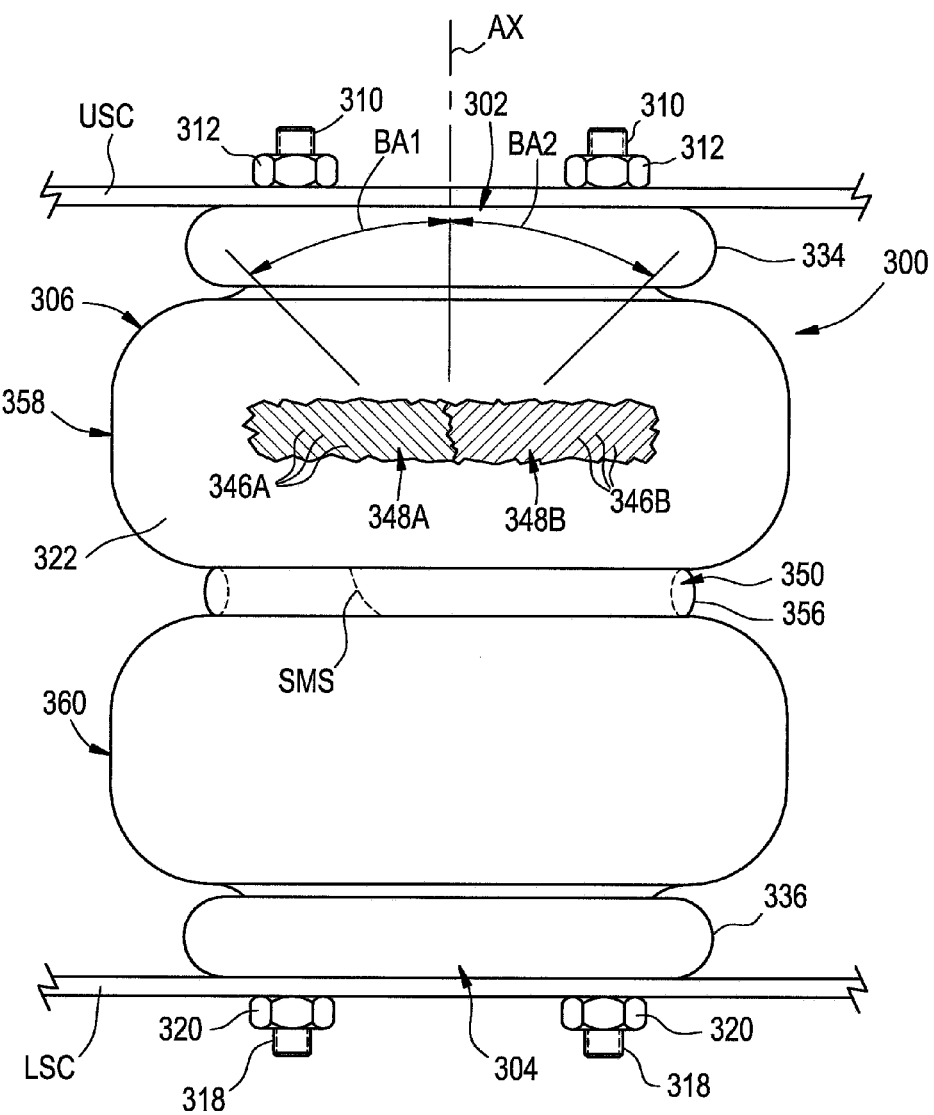
FIG. 8 is a side elevation view of the gas spring assembly in FIG. 7 shown in a first inflated condition.
Figure 10:
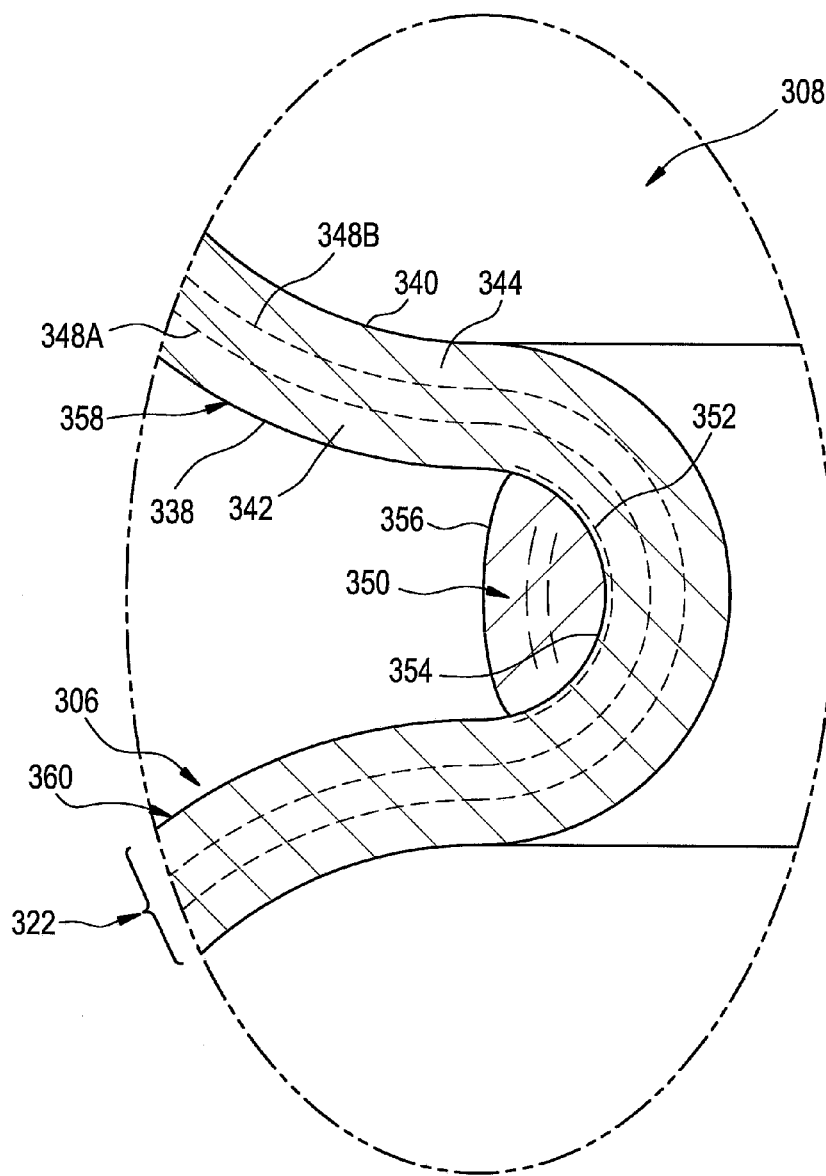
FIG. 10 is an enlarged cross-sectional view of the portion of the flexible spring member identified in Detail 10 of FIG. 9.

Additionally, it will be appreciated that the one or more lengths of filament material, if provided, can be oriented in any suitable manner. As one example, flexible wall 322 is shown in FIGS. 8 and 10 as including a plurality of filament segments 346A of one reinforcing ply 348A disposed at one bias angle BA1 (FIG. 8) and a plurality of filament segments 346B of another reinforcing ply 348B disposed another bias angle BA2 (FIG. 8). It will be appreciated that any suitable bias angles can be used, such as bias angles within a range of from approximately 3 degrees to approximately 87 degrees, for example. In some cases, the filament segments can be disposed at approximately the same bias angle but oriented in the opposing direction, such as is represented in FIG. 8 by reference dimensions BA1 and BA2, for example.

A gas spring assembly according to the subject matter of the present disclosure can also include one or more radial-biasing bands (which may also be referred to herein as restrictive bands) that operatively engage the flexible spring member. Such one or more radial-biasing bands can extend peripherally about the exterior of a flexible spring member and assist in biasing at least a portion of the flexible wall of the flexible spring member in a radially-inward direction. It will be appreciated that the one or more radial-biasing bands can be formed form any suitable elastomeric material or combination of elastomeric and non-elastomeric materials.

One example of such a construction is shown in FIGS. 8-12 in which flexible spring member 306 of gas spring assembly 300 includes a radial-biasing band 350 that can be supported on or along the flexible spring member in any suitable manner. It will be appreciated, however, that in some cases two or more radial-biasing bands can be used in connection with flexible spring member 306 of gas spring assembly 300. As such, it will be appreciated that the foregoing description of radial-biasing bands 290 and 290A is equally applicable to gas spring assembly 300.

In some cases, the one or more radial-biasing bands can be formed as separate components that are positioned along the flexible spring member in spaced relation to the end members of the gas spring assembly. In such cases, the radial-biasing band(s) can be retained in position along the outer surface of the flexible wall of the flexible spring member by frictional contact (i.e., a frictional interface) with the outer surface of the flexible wall of the flexible spring member and/or by way of a suitable flowed-material joint (e.g., an adhesive interface) with the outer surface of the flexible wall.

In other cases, the radial-biasing band can be initially formed from a suitable elastomeric material that is in an uncured condition. The uncured band can be positioned on or along the outer surface of the flexible wall and then subsequently cured to form a bond or joint (i.e., a cure-bonded interface) with the flexible wall. Joints of the foregoing types and kinds are broadly represented in FIG. 10 by dashed line 352. It will be appreciated, however, that in some cases, the material of the flexible wall can be in an uncured condition when one or more uncured bands are positioned on or along the outside surface of the flexible wall. In such cases, the flexible wall and the one or more radial-biasing bands can be cured simultaneously (i.e., a dual cure-bonded interface) and, in some cases, can form a substantially unitary mass of material in which joint 352 may not be present or identifiable.

In some cases, one or more of the radial-biasing bands can be removably secured on or along the outer surface of the flexible wall of the flexible spring member, such as by way of a frictional interface or a non-permanent adhesive interface, for example. In other cases, one or more of the radial-biasing bands can be permanently secured (i.e., inseparable without damage, destruction or material alteration of at least one of the component parts) on or along the outer surface of the flexible wall of the flexible spring member, such as by way of a permanent adhesive interface, a cure-bonded interface or a dual cure-bonded interface, for example. In cases in which two or more radial-biasing bands are used, a common type of interface or two or more different interfaces can be used.

In the arrangement shown in FIGS. 8-12, radial-biasing band 350 includes an exterior surface (not numbered) with a radially-inward surface portion 354 disposed toward outer surface 338 of flexible wall 322. The exterior surface of radial-biasing band 350 also includes a radially-outward surface portion 356 disposed opposite surface portion 354 and, in general, facing away from the outer surface of the flexible wall. In cases in which two or more radial-biasing bands are included, the two or more radial-biasing bands can have a common or otherwise substantially similar construction, such as is described above, for example. Alternately, the two or more radial-biasing bands can be of different sizes, shapes, configurations and/or constructions relative to one another.

The one or more radial-biasing bands can be disposed on or along the flexible spring member in any position or orientation suitable for assisting in biasing at least a portion of the flexible wall of the flexible spring member in a radially-inward direction. In a preferred arrangement, the one or more radial-biasing bands are disposed in spaced relation to the ends and/or the mounting beads of the flexible spring member, the end members and/or the associated structural components of the gas spring assembly. It will be appreciated that the flexible wall of the flexible spring member will have an overall wall length (not identified), such as may be defined as the sum of linear and non-linear (e.g., curved) wall sections extending between mounting beads 328 and 330, for example.

Figure 9:
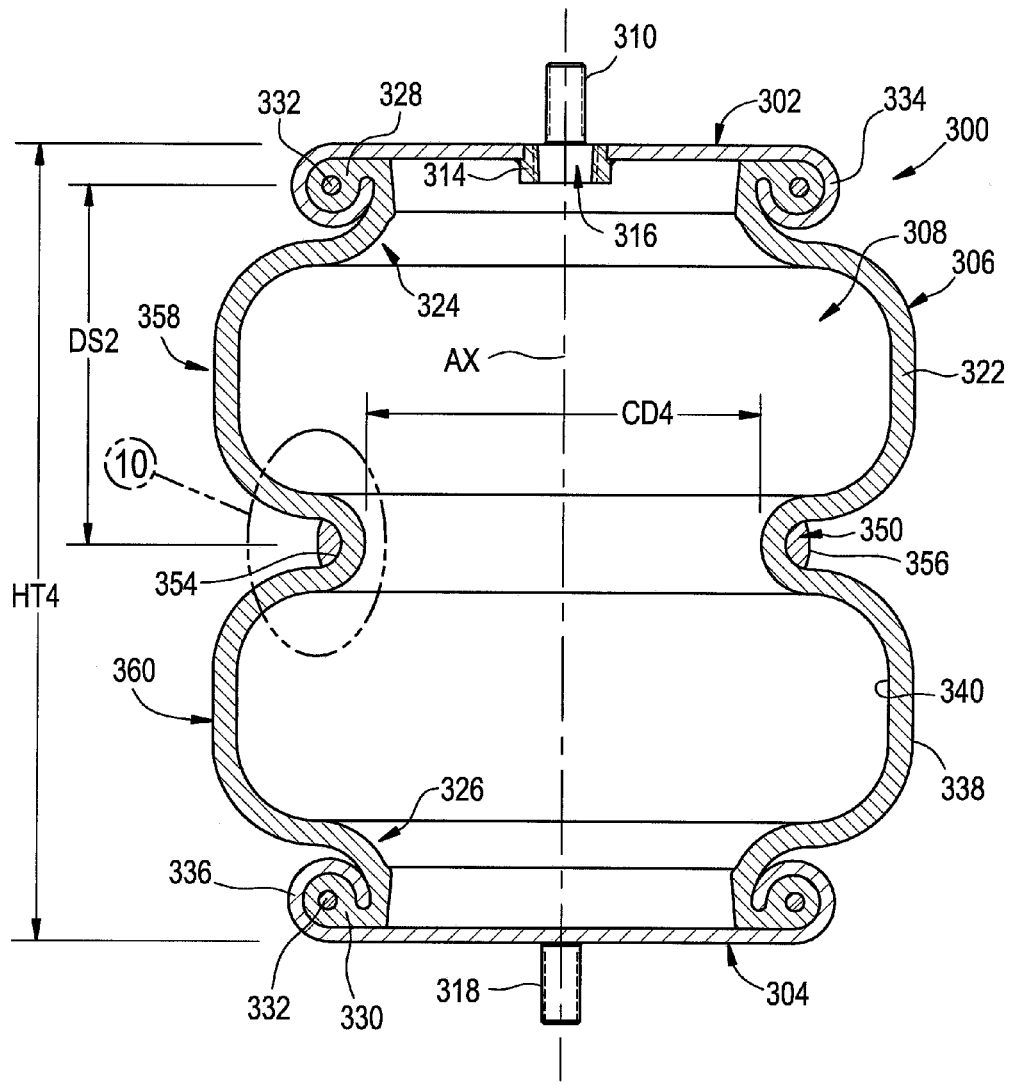
FIG. 9 is a cross-sectional side view of the gas spring assembly in FIGS. 7 and 8 taken from along line 9-9 in FIG. 7.

Radial-biasing band 350 is shown as being disposed along flexible wall 322 in spaced-apart relation to both mounting bead 328 and mounting bead 330. In a preferred arrangement, a radial-biasing band, such as radial-biasing band 350, for example, can be spaced apart from each end (e.g., end 324 and/or 326) and/or mounting bead (e.g., mounting bead 328 and/or 330) by a distance of at least approximately 15 percent of the overall wall length of the flexible wall (e.g., flexible wall 322), such as is represented in FIG. 9 by reference dimension DS2, for example. In the arrangement shown in FIGS. 8-12, radial-biasing band 350 is disposed approximately midway along flexible wall 322 between ends 324 and 326 with convoluted wall portions 358 and 360 being formed along flexible wall 322. It will be appreciated, however, that other arrangements and/or configurations could alternately be used. In a preferred arrangement, a given flexible wall can have a wall section of approximately 70 percent of the overall wall length within which the one or more restrictive bands can be positioned.

With reference, now, to FIGS. 8, 9, 11 and 12, gas spring assembly 300 is illustrated in FIGS. 8 and 9 in a first inflated condition in which the gas spring assembly has a first height, which is represented in FIG. 9 by reference dimension HT4. In some cases, the first inflated condition and first height HT4 can correspond to a nominal design height of the gas spring assembly under normal conditions of use. Under such conditions, the portion of flexible wall 322 engaging radial-biasing band 350 can have a first cross-sectional dimension, such as is represented in FIG. 9 by reference dimension CD4.

Figure 11:
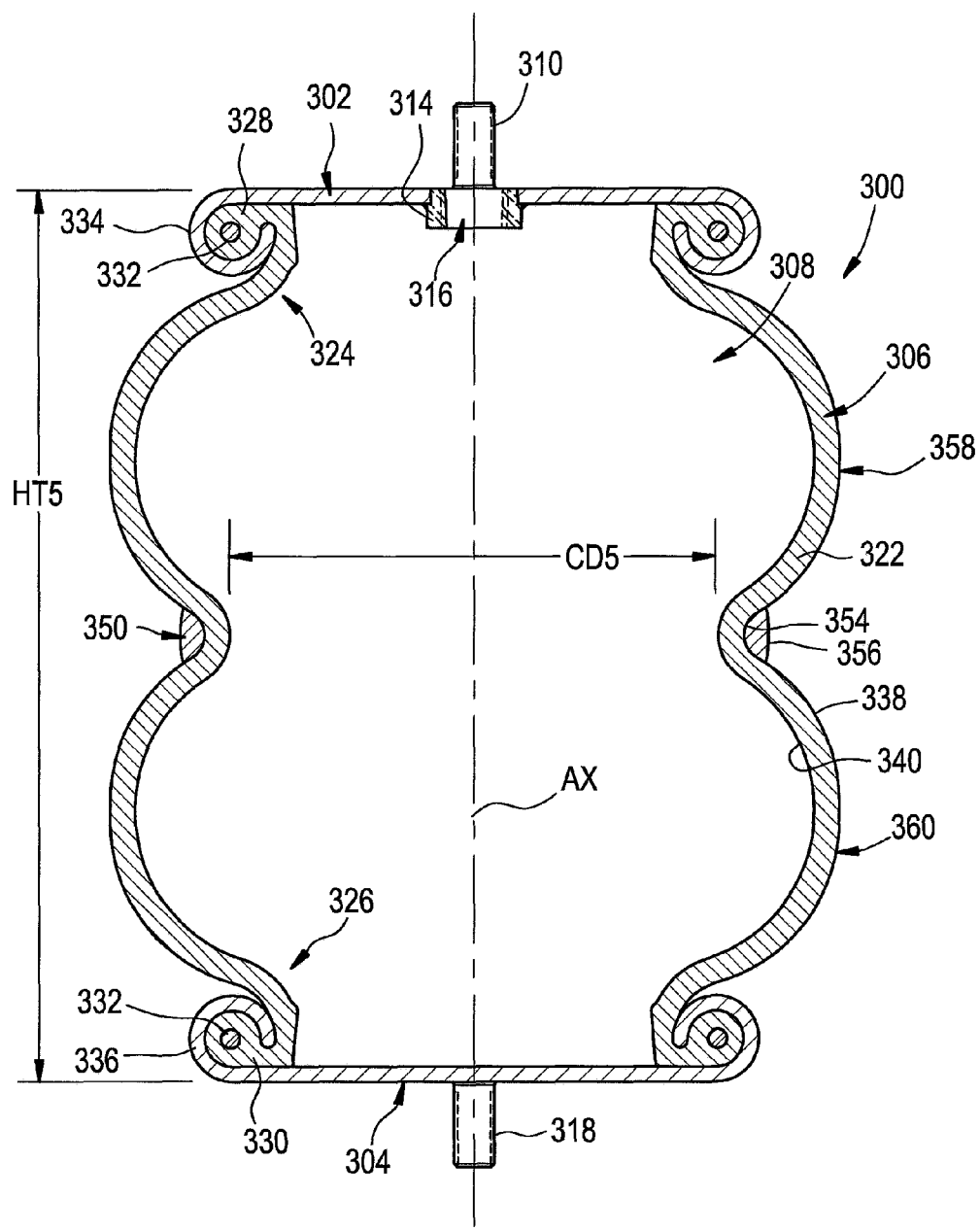
FIG. 11 is a cross-sectional side view of the gas spring assembly in FIGS. 7-10 shown in a second inflated condition.

Gas spring assembly 300 is shown in FIG. 11 in a second inflated condition in which the gas spring assembly has a second height HT5. It will be appreciated that the second inflated condition and second height can correspond to a condition of use under which an increased volume of pressurized gas is contained within the gas spring assembly, such as may occur as a result of a lifting action of a suspension system, for example. As a result of the increased volume of pressurized gas, gas spring assembly 300 assumes second height HT5 which is greater than first height HT4, and the elastomeric nature of radial-biasing band 350 permits a portion of flexible wall 322 to expand in a radially-outward direction, which can thereby permit the gas spring assembly to undergo increased travel and/or stroke. In this manner, a portion of the overall wall length of flexible wall 322, which would otherwise be constrained by an inextensible girdle hoop of a conventional construction, can undergo radially-outward displacement due to the elastomeric nature the radial-biasing band. As a result, radial-biasing band 350 and the portion of flexible wall 322 adjacent thereto can assume a second cross-sectional dimension, which is represented in FIG. 11 by reference dimension CD5, that is greater than cross-sectional dimension CD4.

Figure 12:
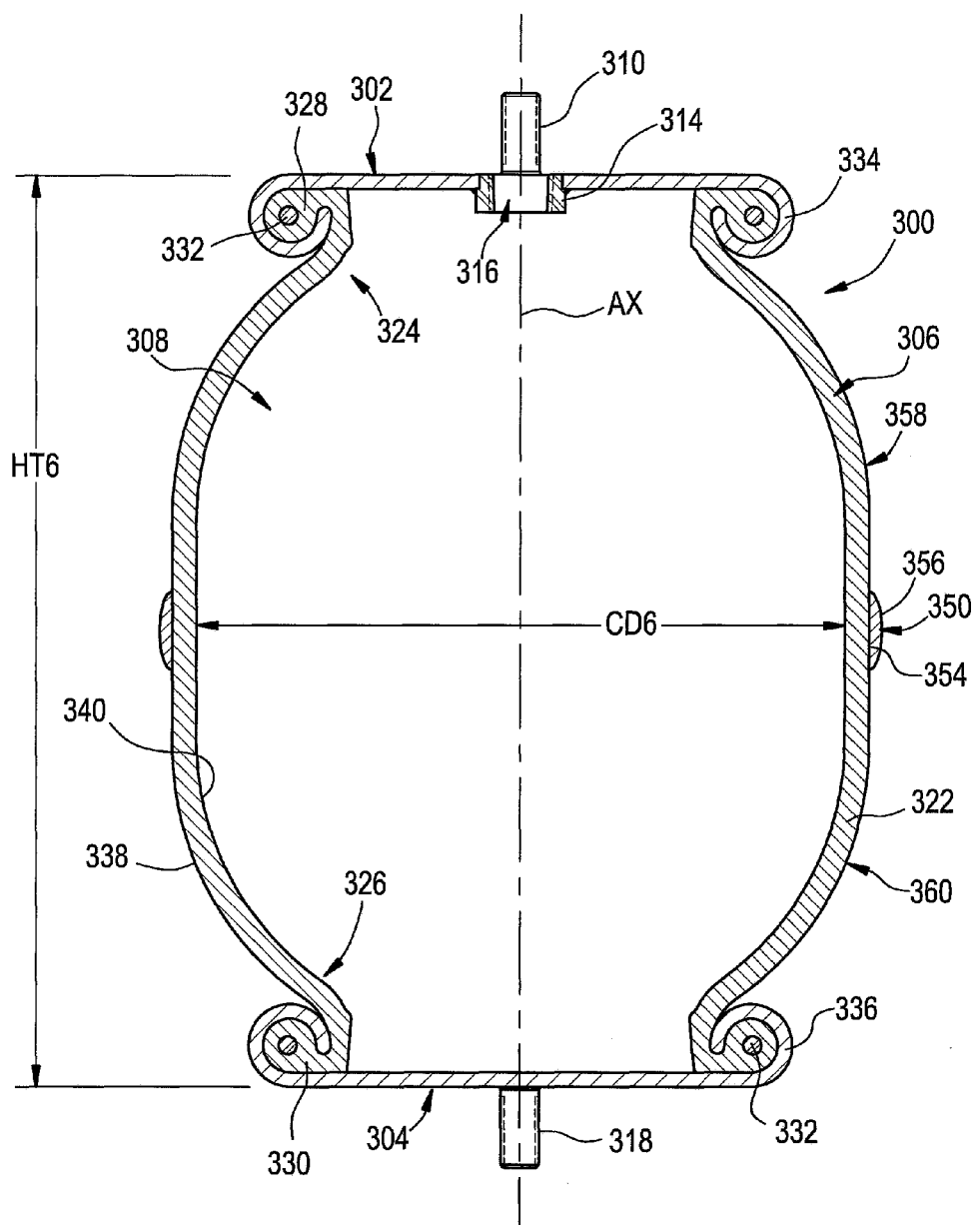
FIG. 12 is a cross-sectional side view of the gas spring assembly in FIGS. 7-11 shown in a third inflated condition.

Gas spring assembly 300 is shown in FIG. 12 in a third inflated condition in which the gas spring assembly has a third height HT6. It will be appreciated that the third inflated condition and third height can correspond to a condition of use under which a further increased volume of pressurized gas is contained within the gas spring assembly, such as may occur as a result of the continuation of a lifting action of a suspension system, for example. As a result of the further increased volume of pressurized gas, gas spring assembly 300 can assume third height HT6 which is greater than second height HT5, and the elastomeric nature of radial-biasing band 350 can further permit the portion of flexible wall 322 to expand in a radially-outward direction, which can thereby permit the gas spring assembly to undergo increased travel and/or stroke. In this manner, a further portion of the overall wall length of flexible wall 322, which would otherwise be constrained by an inextensible girdle hoop of a conventional construction, can undergo radially-outward displacement due to the elastomeric nature the radial-biasing band. As a result, radial-biasing band 350 and the portion of flexible wall 322 adjacent thereto can assume a third cross-sectional dimension, which is represented in FIG. 12 by reference dimension CD6, that is greater than cross-sectional dimension CD5. In this manner, a greater portion of the overall wall length of flexible wall 322 can be utilized to generate stroke of the gas spring assembly.

It will be appreciated that a radial-biasing band, such as restricting bands 290, 290A and/or 350, for example, can be of any suitable size, shape, configuration and/or construction, and that any suitable quantity of one or more radial-biasing bands can be disposed on or along an associated flexible wall (e.g. flexible wall 218 and/or 322). In some cases, a radial-biasing band in accordance with the subject matter of the present disclosure can take the form of an endless, annular element having any suitable cross-sectional shape (e.g., rectangular, thin-walled and/or curved) that is disposed along the flexible wall of a flexible spring element. In other cases, a radial-biasing band can take the form of an elongated strip of material that is wrapped or otherwise applied along the flexible wall of a flexible spring element. In some cases, such a construction can form one or more seams or joints, such as are represented by dashed lines SMS in FIGS. 2 and 8, for example.

Additionally, it will be appreciated that the elongated strip of material can be formed from one or more plies of sheet material. In some cases, two or more plies of sheet material having an approximately equal cross-sectional thickness can be disposed in abutting engagement with one another to build up or otherwise construct a radial-biasing band that has a cross-sectional profile or shape. In other cases, the elongated strip of material can include a cross-sectional profile or shape that is at least partially tapered, curved or otherwise varied in cross-sectional thickness.

Additionally, it will be appreciated that a radial-biasing band in accordance with the subject matter of the present disclosure can be formed from any suitable material or combination of materials. In a preferred arrangement, the one or more radial-biasing band can be at least partially formed from an elastomeric material that will permit the radial-biasing band to elastically deform (i.e., stretch and return/unstretch). Non-limiting examples of suitable elastomeric materials can include natural rubber, synthetic rubber and thermoplastic elastomers (e.g., polyurethane). In some cases, one or more elements and/or materials having substantially-inelastic properties and/or reduced-elastic properties can, optionally be included on, along and/or within the radial-biasing bands. For example, one or more of the radial-biasing bands can include an outer ply (e.g., similar to plies 282 and/or 342) that at least partially forms an outer surface (not numbered), an inner ply (e.g., similar to plies 284 and/or 344) that at least partially forms inner surface (not numbered), and one or more reinforcing plies (e.g., one or more plies similar to plies 288A, 288B, 348A and/or 348B) disposed between the outer and inner surfaces. In a preferred arrangement, the one or more reinforcing plies, if included, can include a plurality of filament segments (e.g., similar to filament segments 286A, 286B, 346A and/or 346B) disposed at bias angles that differ from the bias angles of any reinforcing plies in the flexible wall. In this manner, such reinforcing plies in the radial-biasing bands can include elastomeric performance characteristics that differ from those of the flexible wall.

As discussed above, the one or more radial-biasing bands can assist in controlling inflation in certain areas or sections of the flexible spring member. Additionally, or in the alternative, the one or more radial-biasing bands can assist in promoting contraction and/or folding of the flexible spring member along certain sections or areas of the flexible wall, such as may occur during actuation or stroke of the gas spring assembly and/or under certain conditions of use of the gas spring assembly, such as during lifting and/or kneeling operations, for example. Additionally, or as a further alternative, the one or more restrictive bands could allow a flexible spring member to be designed with an increased overall longitudinal length, which will result in increased travel or stroke of the gas spring assembly without generating a corresponding increase in the collapsed height of the gas spring assembly. Further, in some cases, the inclusion and use of one or more restrictive bands may result in the effective area of the gas spring assembly being more consistent throughout the travel or stroke thereof. In still other cases, the inclusion and use of one or more restrictive bands could assist in reducing interference, contact and/or wear of the flexible spring member with external structures and/or components within the vicinity of the gas spring assembly, such as by helping to control inflation of the flexible spring member along the area or section of the flexible wall that includes the restrictive band.

Figure 13:
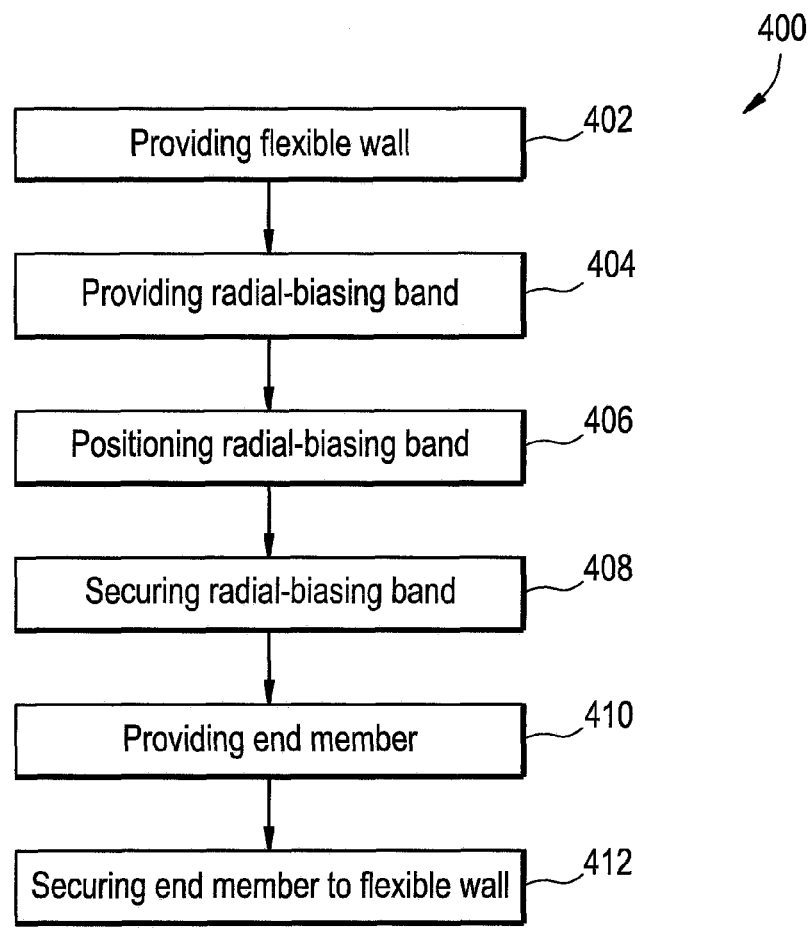
FIG. 13 is a graphical representation of one example of a method of manufacturing a gas spring assembly in accordance with the subject matter of the present disclosure.

One example of a method 400 of manufacturing a gas spring assembly in accordance with the subject matter of the present disclosure can include providing a flexible wall, such as one of flexible walls 218 and/or 322, for example, as is represented in FIG. 13 by item number 402. Method 400 can also include providing a radial-biasing band, such as one of restrictive bands 290, 290A and/or 350, for example, as is represented by item number 404. In some cases, providing a radial-biasing band can include providing one or more lengths of material and forming the radial-biasing band from the one or more lengths of material. Method 400 can further include positioning a radial-biasing band or one or more lengths of material thereof on or along the flexible wall, as is represented by item number 406. Method 400 can also include securing the radial-biasing band along the flexible wall, as is represented by item number 408. Method 400 can further include providing an end member (e.g. end members 202, 204, 302 and/or 304) and securing the end member on or along the flexible wall in spaced-apart relation to the radial-biasing band, as is represented by item numbers 408 and 410, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly comprising:
a first end member and a second end member disposed in spaced relation to said first end member such that a longitudinal axis extends therebetween with said gas spring assembly having a height defined between said first and second end members, said second end member including an outer surface extending longitudinally therealong; and,
a flexible spring member extending longitudinally between opposing first and second ends with said first end operatively attached to said first end member such that a substantially fluid-tight seal is formed therebetween and with said second end operatively attached to said second end member such that a substantially fluid-tight seal is formed therebetween and such that a rolling lobe is formed by said flexible spring member along said outer surface of said second end member, said flexible spring member including:
a flexible wall that is at least partially formed from an elastomeric material, said flexible wall including an outside surface and an inside surface that together with said first and second end members at least partially defines a spring chamber; and,
a radial-biasing band disposed along said outside surface of said flexible wall in longitudinally-spaced relation to said first and second end members and said rolling lobe, said radial-biasing band operative to elastically contract at least a portion of said flexible wall in a radially-inward direction such that:
in a first inflated condition, said gas spring assembly has a first height with said rolling lobe in a first position along said outer surface of said second end member and said radial-biasing band has a first cross-sectional dimension; and,
in a second inflated condition which is less than said first inflated condition, said gas spring assembly has a second height and said radial-biasing band has a second cross-sectional dimension that is less than said first cross-sectional dimension with said rolling lobe of said flexible spring member maintained in approximately said first position along said outer surface of said second end member.

2. A gas spring assembly according to claim 1, wherein said radial-biasing band has a third cross-sectional dimension in a third inflated condition of said gas spring assembly that is substantially different than said second cross-sectional dimension in said second inflated condition.

3. A gas spring assembly according to claim 1, wherein said gas spring assembly includes a first volume of pressurized gas contained in said spring chamber in said first inflated condition, a second volume of pressurized gas contained in said spring chamber in said second inflated condition.

4. A gas spring assembly according to claim 3, wherein said second volume of pressurized gas in said second inflated condition is less than said first volume of pressurized gas in said first inflated condition.

5. A flexible spring member of an associated gas spring assembly, said flexible spring member comprising:
    a flexible wall that is at least partially formed from an elastomeric material, said flexible wall having a longitudinal axis and extending peripherally about said axis and longitudinally between a first end and a second end opposite said first end, said flexible wall including an outside surface and an inside surface that can at least partially define a spring chamber an associated gas spring assembly; and,
    a radial-biasing band disposed along said outside surface of said flexible wall in longitudinally-spaced relation to said first and second ends, said radial-biasing band operative to elastically bias at least a portion of said flexible wall in a radially-inward direction such that:
        in a first inflated condition, said flexible spring member has a first spring chamber volume and a first height with said radial-biasing band having a first cross-sectional dimension; and,
        in a second inflated condition, said flexible spring member has a second spring chamber volume that is less than said first spring chamber volume and a second height that is less than said first height with said radial-biasing band having a second cross-sectional dimension that is less than said first cross-sectional dimension such that a portion of said flexible wall between said first and second ends is gathered radially inwardly by said radial-biasing band.

6. A flexible spring member according to claim 5, wherein said radial-biasing band is at least partially formed from an elastomeric material including at least one of natural rubber, synthetic rubber and thermoplastic elastomer.

7. A flexible spring member according to claim 6, wherein said radial-biasing band includes an outer surface facing away from said outside surface of said flexible wall, an inner surface disposed toward said outside surface of said flexible wall, and an plurality of reinforcing layers at least partially embedded within said elastomeric material.

8. A flexible spring member according to claim 5, wherein said radial-biasing band is secured to said outside surface of said flexible wall by way of a friction interface such that said radial-biasing band is removably secured to said flexible wall.

9. A flexible spring member according to claim 5, wherein said radial-biasing band is secured to said outside surface of said flexible wall by way of an adhesive interface.

10. A flexible spring member according to claim 9, wherein said adhesive interface forms a permanent joint between said radial-biasing band and said flexible wall such that said radial-biasing band is permanently secured to said flexible wall.

11. A flexible spring member according to claim 9, wherein said adhesive interface forms a removable joint between said radial-biasing band and said flexible wall such that said radial-biasing band is removably secured to said flexible wall.

12. A flexible spring member according to claim 5, wherein said radial-biasing band is secured along said outside surface of said flexible wall by way of a cure-bonded interface such that said radial-biasing band is permanently secured to said flexible wall.

13. A flexible spring member according to claim 12, wherein said cure-bonded interface is a dual cure-bonded interface such that said radial-biasing band is formed as a substantially-unitary mass with at least a portion of said flexible wall.

14. A flexible spring member according to claim 5, wherein said radial-biasing band is one of a plurality of radial-biasing bands disposed in longitudinally-spaced relation to one another along said outside surface of said flexible wall and in longitudinally-spaced relation to said first and second ends.

15. A flexible spring member according to claim 5, wherein said flexible wall has an overall length and said radial-biasing band is spaced apart from said first and second ends by a distance that is at least fifteen (15) percent of said overall length of said flexible wall.

16. A gas spring assembly comprising:
    a first end member;
    a second end member disposed in spaced relation to said first end member such that a longitudinal axis extends therebetween with said gas spring assembly having a height defined between said first and second end members, said second end member including an outer surface extending longitudinally therealong; and,
    a flexible spring member extending longitudinally between opposing first and second ends with said first end operatively attached to said first end member such that a substantially fluid-tight seal is formed therebetween and with said second end operatively attached to said second end member such that a substantially fluid-tight seal is formed therebetween and such that a rolling lobe is formed by said flexible spring member along said outer surface of said second end member, said flexible spring member including:
        a flexible wall that is at least partially formed from an elastomeric material, said flexible wall including an outside surface and an inside surface that together with said first and second end members at least partially defines a spring chamber; and,
        a radial-biasing band disposed along said outside surface of said flexible wall in longitudinally-spaced relation to said first and second end members and said rolling lobe, said radial-biasing band operative to elastically contract at least a portion of said flexible wall in a radially-inward direction such that:
            in a first inflated condition, said gas spring assembly having a first spring chamber volume and a first height with said rolling lobe disposed in a first position along said outer surface of said second end member and with said radial-biasing band having a first cross-sectional dimension; and,
            in a second inflated condition, said gas spring assembly having a second spring chamber volume that is less than said first spring chamber volume and a second height that is less than said first height, said radial-biasing band having a second cross-sectional dimension that is less than said first cross-sectional dimension such that a portion of said flexible wall between said first end member and said rolling lobe is gathered radially inwardly by said radial-biasing band and said rolling lobe of said flexible spring member remains in approximately said first position along said outer surface of said second end member at said second height of said gas spring assembly.

17. A gas spring assembly according to claim 16, wherein said radial-biasing band is at least partially formed from an elastomeric material including at least one of natural rubber, synthetic rubber and thermoplastic elastomer.

18. A gas spring assembly according to claim 16, wherein said radial-biasing band is secured to said outside surface of said flexible wall by way of a friction interface such that said radial-biasing band is removably secured to said flexible wall.

19. A gas spring assembly according to claim 16, wherein said radial-biasing band is secured to said outside surface of said flexible wall by way of an adhesive interface.

20. A gas spring assembly according to claim 16, wherein said radial-biasing band is secured along said outside surface of said flexible wall by way of a cure-bonded interface such that said radial-biasing band is permanently secured to said flexible wall.

* * * * *